June 19, 1928.
R. E. DRAKE
1,674,503
PROCESS OF MAKING RUBBER SOLES
Filed Feb. 9, 1927
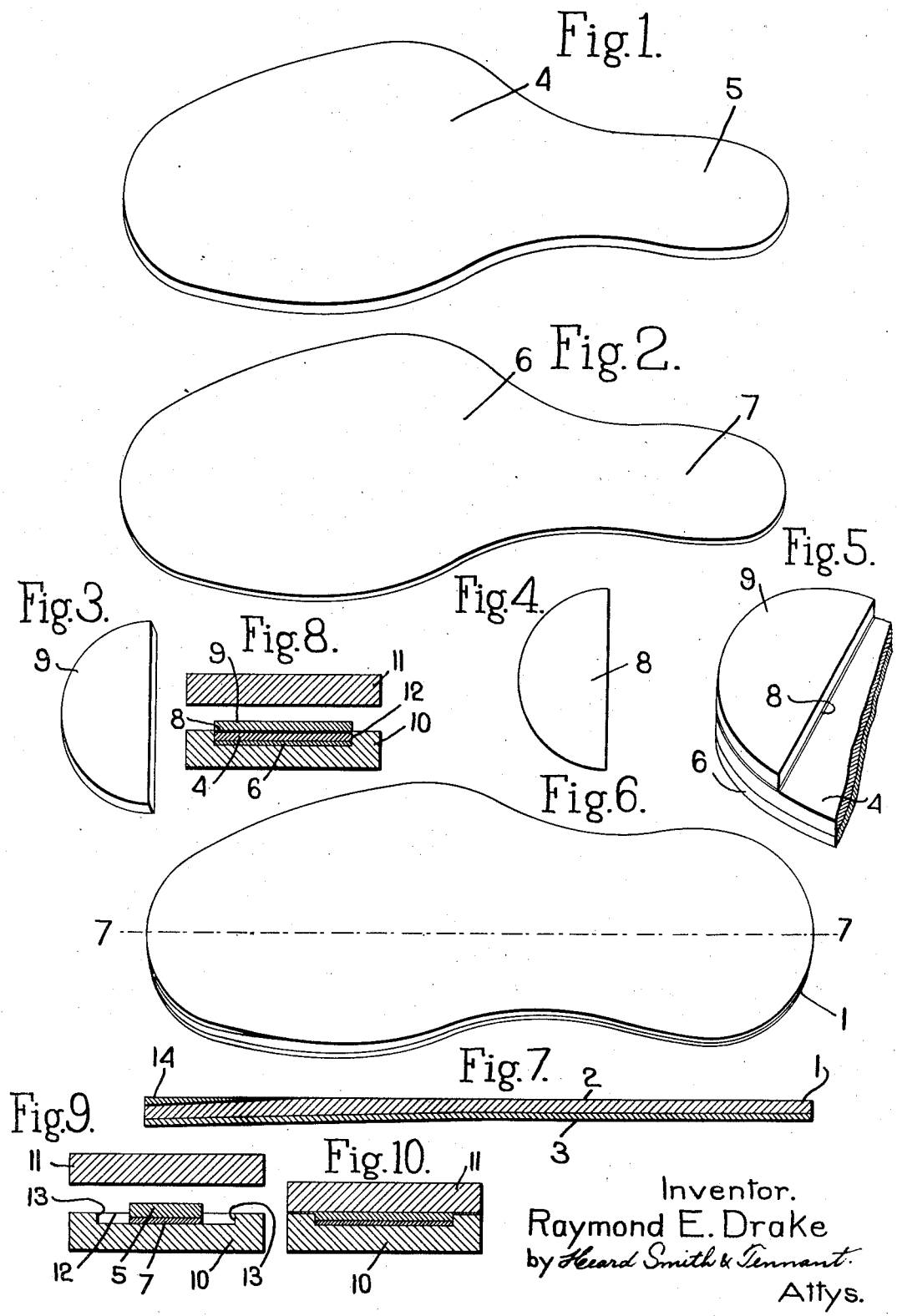
Inventor.
Raymond E. Drake
by Heard Smith & Tennant.
Attys.

Patented June 19, 1928.

1,674,503

UNITED STATES PATENT OFFICE.

RAYMOND E. DRAKE, OF BROCKTON, MASSACHUSETTS, ASSIGNOR TO AVON SOLE COMPANY, OF AVON, MASSACHUSETTS, A CORPORATION OF MASSACHUSETTS.

PROCESS OF MAKING RUBBER SOLES.

Application filed February 9, 1927. Serial No. 166,933.

This invention relates to rubber soles for use in the manufacture of boots and shoes and particularly to rubber soles of that type which comprises a layer or stratum of fiberized rubber and a layer or stratum of unfiberized rubber united by the vulcanizing process. A sole of this type has the advantage that it can be sewed to the shoe as the stratum of fiberized rubber makes a good anchorage for the stitches and the layer of unfiberized rubber also provides the desirable yielding and elastic tread surface for the sole.

One of the objects of the present invention is to provide a novel method of making a rubber sole in which the toe portion is thickened.

In order to give an understanding of the invention I have illustrated in the drawings a selected embodiment thereof which will now be described after which the novel features will be pointed out in the appended claim.

Figs. 1, 2, 3 and 4 of the drawing show the different parts of which the sole is made;

Fig. 5 is a fragmentary perspective view showing the toe portion of the sole with the parts assembled;

Fig. 6 is a perspective view of the completed sole;

Fig. 7 is a longitudinal section through the sole on the line 7—7, Fig. 6;

Figs. 8 and 9 are sectional views through the mold in which the sole is finally molded;

Fig. 10 is a view similar to Fig. 9 but showing the mold closed.

Referring first to Figs. 6 and 7 the completed sole, which is indicated generally at 1, comprises a base layer or stratum 2 of fiberized rubber and a tread layer or stratum 3 of unfiberized rubber, these two strata being vulcanized together to make a unitary structure.

In making the sole I first provide a blank 4 which is formed of fiberized rubber that is, a rubber which has the fibrous ingredient incorporated therein. Fibres of various kinds may be employed without in any way departing from the invention and I will preferably use a fibrous filling or material in which the fibres are relatively short, such for instance as paper, stock or cotton fibres ground to short lengths. These fibres are milled or worked into the rubber in any approved way and while the proportion of the fibre to the rubber may vary without departing from the invention I will preferably use as large an amount of the fibres as can be readily worked into the rubber.

The blank 4 is cut from a sheet of fiberized rubber of substantially uniform thickness and while it has the general shape of the sole yet the heel and shank portion 5 thereof is considerably narrower than the corresponding portion of the completed sole.

A similar blank 6 of unfiberized rubber is provided and this may be cut from a sheet of unfiberized rubber having uniform thickness. The blank 6 has the same shape as the blank 4, that is, while the fore part is substantially the size of the completed sole yet the heel and shank part 7 is considerably narrower than the corresponding parts of the completed sole. These two blanks 4 and 6 are then superposed one on the other and are then subjected to a vulcanizing process under pressure by which they are integrally united. Before this is done, however, a reinforcement is applied to the toe portion. This reinforcement comprises a piece 8 of some fibrous material which has marked strength and a toe blank 9 of fiberized rubber which is superposed on the reinforcing layer 8.

While any suitable fibrous material may be used for the reinforcing layer 8 I will preferably employ a material made of unspun fibres united by latex or a rubber compound. This reinforcing layer 8 is placed on the toe portion of the blank 4 and the toe blank 9 is then superposed on the reinforcing layer 8. When the parts which are to make the sole are assembled, therefore, they comprise the layer 6 of unfiberized rubber, the layer 4 of fiberized rubber, the reinforcing layer 8 at the toe portion and the toe blank 9.

After these parts have been assembled they are placed in a mold and subjected to pressure and heat thereby vulcanizing the parts together to make an integral structure. The mold which is used has a mold cavity conforming in outline to the desired outline of the completed sole 1. Said mold is also made of greater depth at the toe portion than at the heel portion. The thickness of the layers 4 and 6 is such that when they are assembled and placed in the mold they are slightly thicker than the depth of the mold especially at the shank and heel portion. At the toe portion the assembled parts of the completed sole have a contour substantially the same as that of the mold but at the heel portion the superposed ends 5 and 7 of the layers 4 and 6 are considerably narrower than the heel portion of the mold.

Any suitable mold may be employed and merely for the purpose of illustration I have shown a mold comprising two members 10 and 11, the member 10 having the mold cavity 12 therein and the member 11 being in the form of a cap or presser plate.

When the assembled layers 4, 6, 8 and 9 are placed in the mold said layers at the toe portion will extend from one side to the other of the mold as shown in Fig. 8. At the heel, however, the superposed portions 5 and 7 are very much narrower than the heel portion of the mold so that when the assembled parts of the heel are placed in the mold there will be a considerable space between the superposed heel portions 5, 7 and the side walls 13 of the mold as shown in Fig. 9.

As stated above the mold is made so that the mold cavity 12 is of less depth at the heel portion of the mold than at the toe portion and hence when the assembled parts of the sole are placed in the mold the superposed heel portions 5 and 7 will project somewhat above the top of the mold cavity. When the mold is closed under heavy pressure such pressure will cause the layers of the assembled sole to flow and to fill all spaces in the mold. This action will operate to cause the heel portions 5 and 7 of the layers 4, 6 to flow laterally and thus fill the heel portion of the mold, this operation at the same time reducing the thickness of the superposed heel portions to that of the heel portion of the mold as shown in Fig. 10. At the same time the pressure on the toe portion of the mold causes said toe portion to conform to the shape of the mold and gives the toe portion the general shape shown in Fig. 7, the cap member 9 being flattened out more or less and the square edge thereof being reduced to a thin edge which merges into the upper surface of the layer 5. The subjecting of the assembled parts of the sole to this pressure produces a sole which has the shape of the mold cavity, it being thicker at the toe portion than at the heel portion as seen in Fig. 7. Moreover, by continuing the pressure and subjecting the mold to the action of heat a vulcanizing process will take place which will integrally unite the layers making up the sole and thus forming one integral structure which will have a lower stratum 3 of unfiberized rubber which is so-extensive with the sole, a second stratum 2 of fiberized rubber which is also co-extensive with the sole, a reinforcing layer or stratum 8, it being confined between the stratum 2 and the upper stratum 14 formed by the toe blank 9. The upper stratum 14 is of the same structural characteristics as the stratum 2 so that in effect the reinforcing layer 8 is embedded in the stratum of fiberized rubber.

The complete sole, therefore, comprises a lower stratum of unfiberized rubber and another stratum of fiberized rubber vulcanized together, said stratum of fiberized rubber having embedded in its toe portion a fiberized reinforcing member.

A sole made in this way can be as readily sewed to the shoe as an ordinary leather shoe. When it is thus sewed to the shoe the stitches will sink into or become embedded in the soft rubber stratum 3 but will be firmly anchored in the fiberized stratum 2. This has the advantage that while the stitches have a firm anchorage yet they are located below the wear surface of the sole and will not be subjected to the same wear as if they were on the wear surface. Furthermore, the sole has the desirable soft elastic tread and owing to the fact that the strata 2 and 3 are vulcanized together a substantially integral structure is produced which cannot separate along the division line between the strata 2 and 3.

I claim:

The process of making a shoe sole which consists in superposing two similarly shaped blanks, one of fiberized rubber and the other of unfiberized rubber, the fore part of each having substantially the shape of the fore part of the sole and the combined thickness of the blanks at the fore part being slightly greater than that of the sole, the shank and heel part of each blank being of considerably less width than the corresponding part of the sole, and the combined thicknesses of said heel part and shank being appreciably greater than the thickness of the corresponding part of the completed sole, and subjecting the superposed layers to pressure and heat, whereby the layers are vulcanized together, and the shank and heel portions are caused to flow laterally to produce the shank and heel portion of the sole which is wider than that of the blank but thinner than the combined blanks.

In testimony whereof I have signed my name to this specification.

RAYMOND E. DRAKE.